United States Patent [19]

Jones et al.

[11] 4,456,462
[45] Jun. 26, 1984

[54] CONTROL OF INDIVIDUAL SECTION GLASSWARE FORMING MACHINE

[75] Inventors: Stanley P. Jones, Tickhill; Derek Gennard, Maltby, both of England

[73] Assignee: Emhart Industries, Inc., Farmington, Conn.

[21] Appl. No.: 433,114

[22] PCT Filed: Feb. 22, 1982

[86] PCT No.: PCT/GB82/00054
§ 371 Date: Sep. 30, 1982
§ 102(e) Date: Sep. 30, 1982

[87] PCT Pub. No.: WO82/02886
PCT Pub. Date: Sep. 2, 1982

[30] Foreign Application Priority Data
Feb. 27, 1981 [GB] United Kingdom ............... 8106202

[51] Int. Cl.³ .............................................. C03B 9/40
[52] U.S. Cl. ............................................ 65/158; 65/29;
65/163; 65/DIG. 13; 364/473; 364/476
[58] Field of Search ................... 65/29, 158, 159, 163,
65/164, 260; 364/473, 476

[56] References Cited

U.S. PATENT DOCUMENTS

| | | | |
|---|---|---|---|
| 4,203,752 | 5/1980 | Becker et al. | 65/163 |
| 4,255,179 | 3/1981 | Foster | 65/260 X |
| 4,266,961 | 5/1981 | Wood | 65/164 X |
| 4,313,750 | 2/1982 | Lulejian et al. | 65/160 |
| 4,367,087 | 1/1983 | Cardenas-Franco et al. | 65/DIG. 13 X |

FOREIGN PATENT DOCUMENTS

| | | |
|---|---|---|
| 2422603 | 4/1979 | France . |
| 1599801 | 4/1978 | United Kingdom . |
| 1599802 | 4/1978 | United Kingdom . |
| 1599803 | 4/1978 | United Kingdom . |

Primary Examiner—Arthur D. Kellogg
Attorney, Agent, or Firm—Gene Warzecha

[57] ABSTRACT

An individual section glassware forming machine has three operating stations including an intermediate reheating station (B) and a shaping station (C). Transfer means (5) for carrying parisons from the intermediate station (B) to the shaping station (C) is controlled by means of an electrical command signal the magnitude of which varies in accordance with a desired position against time curve for the movement of a reheated parison. The signal is supplied to an electrical or hydraulic servo-mechanism (32; 42) which is operated by the electrical command signal to control the movement of the transfer means (5).

16 Claims, 8 Drawing Figures

CONTROL OF INDIVIDUAL SECTION GLASSWARE FORMING MACHINE

Technical Field

This invention is concerned with an individual section glassware forming machine comprising three operating stations which are, respectively, a blank station including a blank mould for forming a parison, an intermediate station in which reheating of the parison takes place, and a shaping station including a blow mould for finally shaping an article of glassware, and transfer means driven by a motor for carrying a reheated parison from the intermediate station to the shaping station.

Background Art

In the complete specification of U.K. Pat. No. 1,491,859 there is described an individual section glassware forming machine which has three operating stations, a parison being formed from a gob of molten glass at a blank station, the parison being supported at an intermediate station for a part of the reheating time during which the outer layer of glass which was chilled during the parison formation is reheated by the heat retained in the other parts of the parison, and the reheated parison being shaped into an article of glassware at a shaping station. Such a three station machine has substantial advantages over the conventional individual section glassware forming machine which comprises only two stations, a blank station where the parison is formed in a blank mould and a shaping station where the article of glassware is shaped from the parison. In particular, the three station machine enables articles of glassware to be produced at higher rates of production that can be accomplished using the conventional machine. Such higher rates of production are enabled primarily by the presence of the intermediate station for the parison reheating stage of the process, with a result that the shaping station can be used solely for shaping the article of glassware and time is not used in the shaping station for parison reheating as has been necessary in many processes for forming glassware in the conventional individual section machine.

In a three station machine, the reheated parison is transferred from the intermediate station to the shaping station while it consists of glass which is in a plastic condition and which is therefore very soft, floppy and readily deformable. This is indeed the desired condition of the reheated parison for shaping by the immediate application of air under pressure within the parison. However, the fact that the reheated parison has these properties at the time of transfer means that care must be taken during this transfer if the reheated parison is not to be subjected to undesirable deformation during this transfer.

There is, therefore, a problem in connection with the movement of the reheated parison from the intermediate station to the shaping station because of the conflict which exists between the need to move the reheated parison speedily so as not to detract from the advantage of the three station machine in providing higher rates of production, and the need to treat the parison carefully during this transfer so that the reheated parison is not undesirably deformed by the motion of the transfer during movement from the intermediate station to the shaping station.

Because a straight line movement by direct pneumatic piston and cylinder action provides too large an acceleration and deceleration for the reheated parison, it has been proposed to effect the transfer of the reheated parisons from the intermediate station to the shaping station in an arcuate movement under the control of a pneumatic piston and cylinder device. However, this has proved unsatisfactory because an arcuate movement imposes inertia forces on the reheated parison in both the vertical direction and a horizontal direction, and the vertical forces are liable to cause undesired and unpredictable extensions of the reheated parison.

Another approach to providing a suitable movement for the transfer of the reheated parisons from the intermediate station to the shaping station has been to drive a transfer carriage in a straight line movement by a member which is itself moved angularly in a part-rotary motion by pneumatic piston and cylinder device with a result that the motion of the transfer carriage taking the reheated parison from the intermediate station to the shaping station approximates to a simple harmonic motion. This approximation to simple harmonic motion is intended to minimise the inertia forces exerted on the reheated parison. However, even motions approximating to a simple harmonic motion have not proved entirely satisfactory in preventing swinging of the parisons during the transfer from the intermediate station to the shaping station, and, even if such swinging does not lead to contact between the adjacent parisons which are being transferred together from the intermediate station to the shaping station, it can cause deformation of the parison with consequential defects in the final article of glassware.

Disclosure of Invention

In an individual section glassware forming machine in accordance with the invention, the machine comprises generating means for generating an electrical command signal the magnitude of which varies in accordance with the desired position against time curve for the movement of a reheated parison from the intermediate station to the shaping station, and an electrical or hydraulic servo-mechanism operated by said electrical command signal for controlling the movement of the transfer means.

By the use of the present invention a reheated parison may be accelerated from rest at the intermediate station and decelerated to rest at the shaping station in accordance with any acceleration against time curve desired (within the physical limitations of the machine) by the generation of an appropriate command signal.

A machine in accordance with the present invention also has the advantage that the motion of the transfer of reheated parisons may be readily changed when the article being made by the machine is changed in order to meet the requirements of the reheated parison used in the formation of the new article without any necessity to change any of the mechanical parts employed in the transfer from the intermediate station to the shaping station.

In order to ensure that the desired position against time curve is closely followed, the machine comprises position indicating means operable to provide an electrical position signal representative of the actual position of the transfer means, and difference means operable to compare the position signal with the command signal and to derive from this comparison an error signal which is used to operate the servo-mechanism.

In order to prevent damage occurring to the machine, the machine comprises emergency action means operable to compare the position signal with a command signal and initiate emergency action if the position signal deviates from the command signal by more than a predetermined tolerance. The emergency action means is operable, on starting the machine, to compare the position signal with a signal corresponding to the transfer means being within a predetermined distance from the intermediate station, and to initiate emergency action if the transfer means is not within this distance on starting of the machine. In order to prevent a collison between the blow head of the machine at the shaping station and the transfer means, the emergency action means is operable at the time in each cycle when the blow head of the machine is due to be lowered at the shaping station, to compare the position signal with a signal corresponding to the transfer means being within a predetermined distance of the intermediate station and to initiate emergency action if the transfer means is not within that distance.

In order to prevent variations in frictional effects from affecting the operation of the servo-mechanism, the machine comprises a tachometer which is driven by the motor and provides velocity feedback to the servo-mechanism. In order to prevent damage to the machine, the emergency action means is operable to take emergency action if the rotational speed of the motor detected by the tachometer exceeds a predetermined maximum.

The electrical command signal should vary with time in such a manner that a reheated parison is smoothly accelerated from its rest position at the intermediate station by a low initial acceleration to a selected maximum speed of transfer and then smoothly decelerated to be brought to rest at the shaping station. In one example, the generated electrical command signal is a cubic-parabolic-cubic curve, that is a curve which has portions which are successively cubic, parabolic, cubic, cubic, parabolic, and cubic over the time of transfer of the parison from the intermediate station to the shaping station. Preferably, the electrical command signal is such that the reheated parison is moved from the intermediate station to the shaping station in a motion in which the period of acceleration from rest at the intermediate station is shorter than the period of deceleration to rest at the shaping station. Preferably, the transition between acceleration and deceleration in the movement of the reheated parison from the intermediate station to the shaping station occurs at a time within a range of 0.3 to 0.4 of the total time of transfer of the parison.

BEST MODE OF CARRYING OUT THE INVENTION

Figure 1:
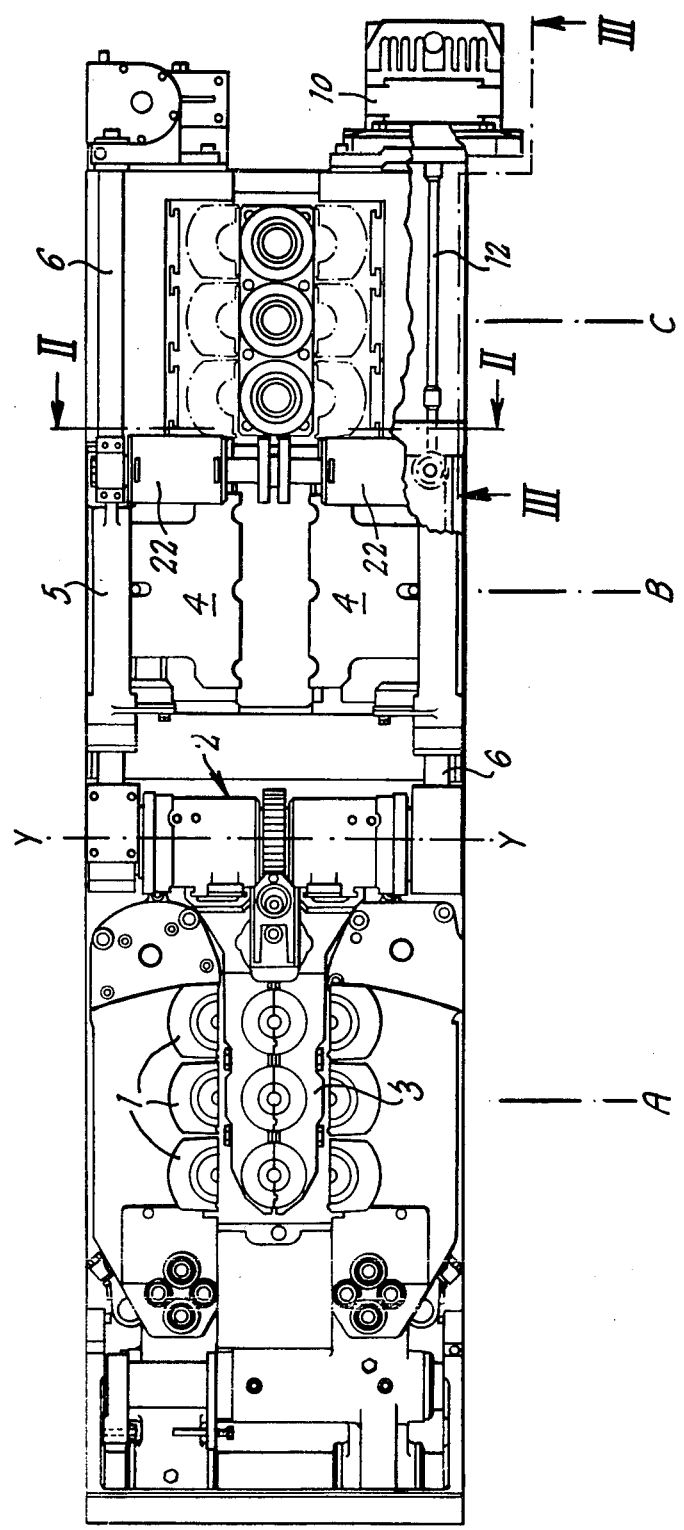
FIG. 1 is a diagrammatic plan view of a machine in accordance with the invention with parts omitted for clarity.

The glassware forming machine shown in the drawings is a triple gob three station individual section machine. Gobs of molten glass are fed to three blank moulds 1 (shown open in FIG. 1) at a blank station A where the gobs are formed into parisons in an inverted position. A transfer and invert mechanism 2 moves the three parisons formed at the blank station A simultaneously to an intermediate reheating station B. The mechanism 2 is rotatable about a transverse horizontal axis y—y, a neck ring arm 3 of the mechanism 2 swinging through 180° to transfer the parisons from the station A to the station B in a conventional manner. At the intermediate station B, the parisons are received in an upright position by support jaws of a transfer carriage 5 which is horizontally movable along spaced guide rails 6 between the intermediate station B and a shaping station C of the machine. The transfer carriage 5 thus forms transfer means for carrying a reheated parison from the station B to the station C. The parisons are formed into articles of glassware at the shaping station C, being removed from the station C by take-out means (not shown).

Figure 2:
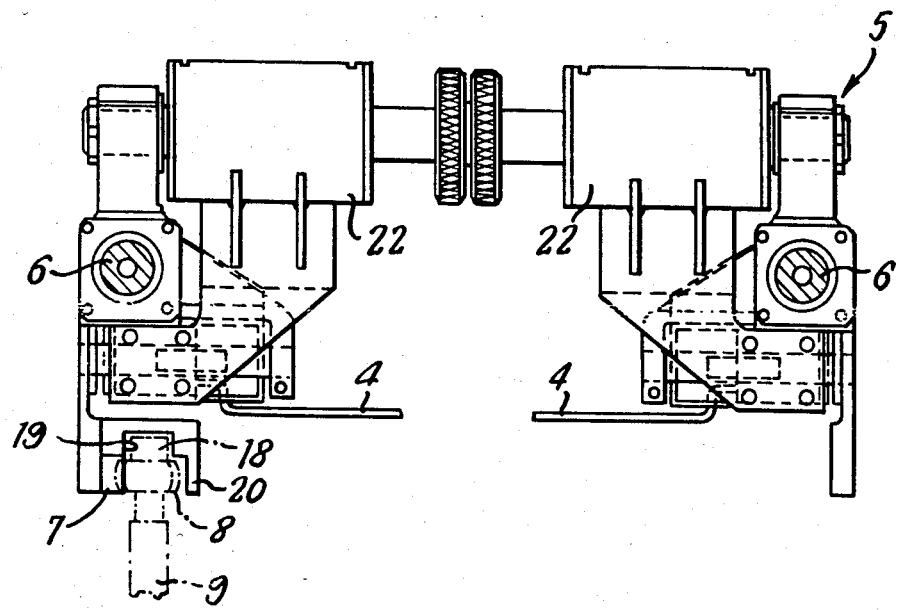
FIG. 2 is a vertical section view, on an enlarged scale, showing the upper part of the structure as seen on the line II—II of FIG. 1.
Figure 3:
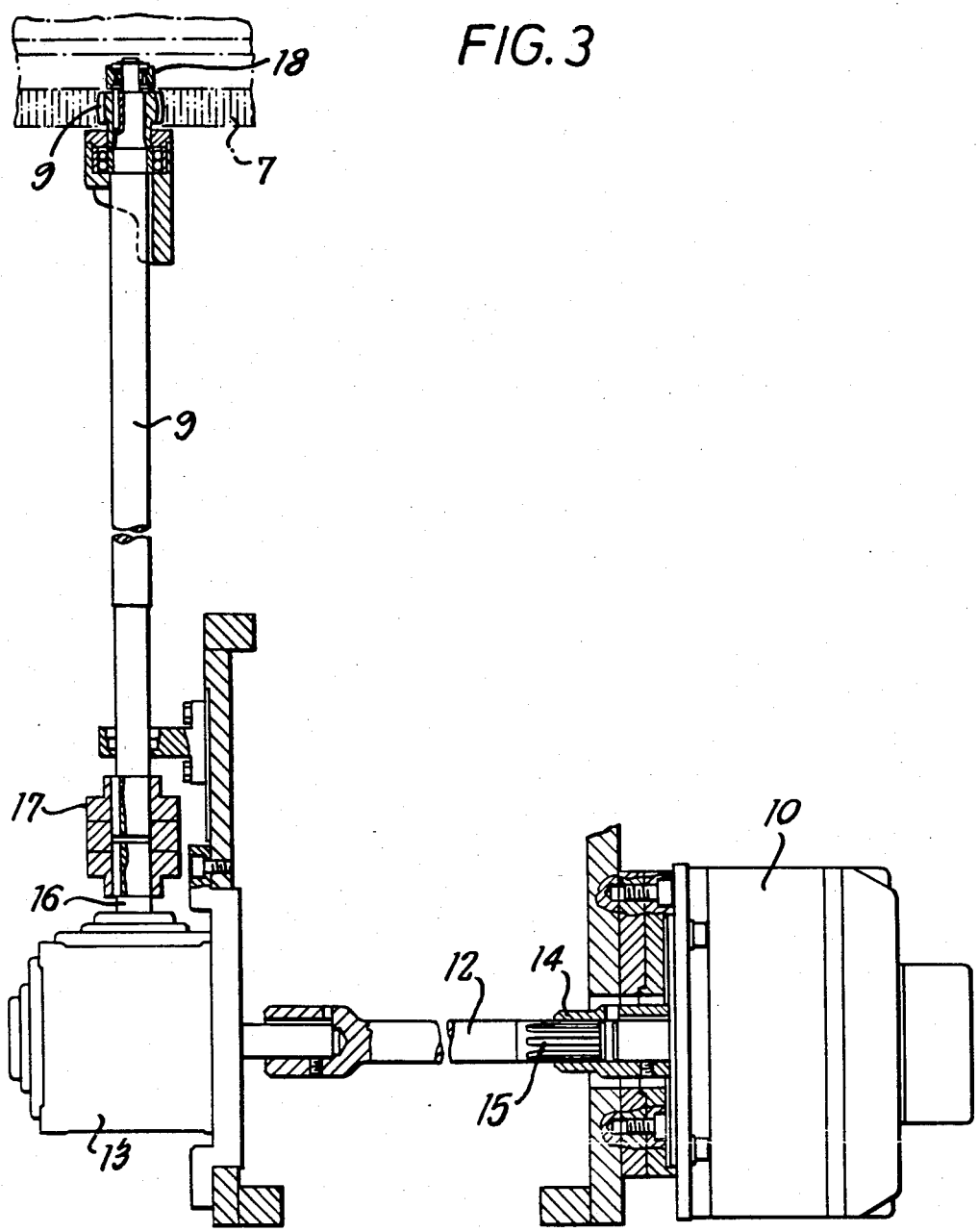
FIG. 3 is a view, on an enlarged scale, looking in the direction of the arrows III—III in FIG. 1, with parts in section.

As shown in FIGS. 2 and 3, the lower edge of the carriage 5 carries on one side thereof a rack 7 which meshes with a pinion 8 secured on one end of a vertical drive shaft 9 driven by an electrical motor 10 through a horizontal drive shaft 12 and a gearbox 13. The motor 10 is arranged to drive the transfer carriage between the stations B and C. The motor 10 is a precision, permanent magnet DC motor and has an output shaft carrying a splined sleeve 14 engaging with cooperating splines 15 on the end of the horizontal shaft 12. The gearbox 13 has meshing bevelled gears which turn the direction of drive through 90° from the horizontal shaft 12 to a vertical stub shaft 16 secured to the lower end of the shaft 9 by a coupling 17. The uppermost end of the vertical shaft 9 carries a roller 18 which is guided within a rectangular section recess 19 in a shroud 20 attached to the underside of the carriage 5.

FIGS. 1 and 2 show two pneumatic cylinders 22 on the transfer carriage 5, these cylinders provide the power to open and close the support jaws 4.

Figure 4:
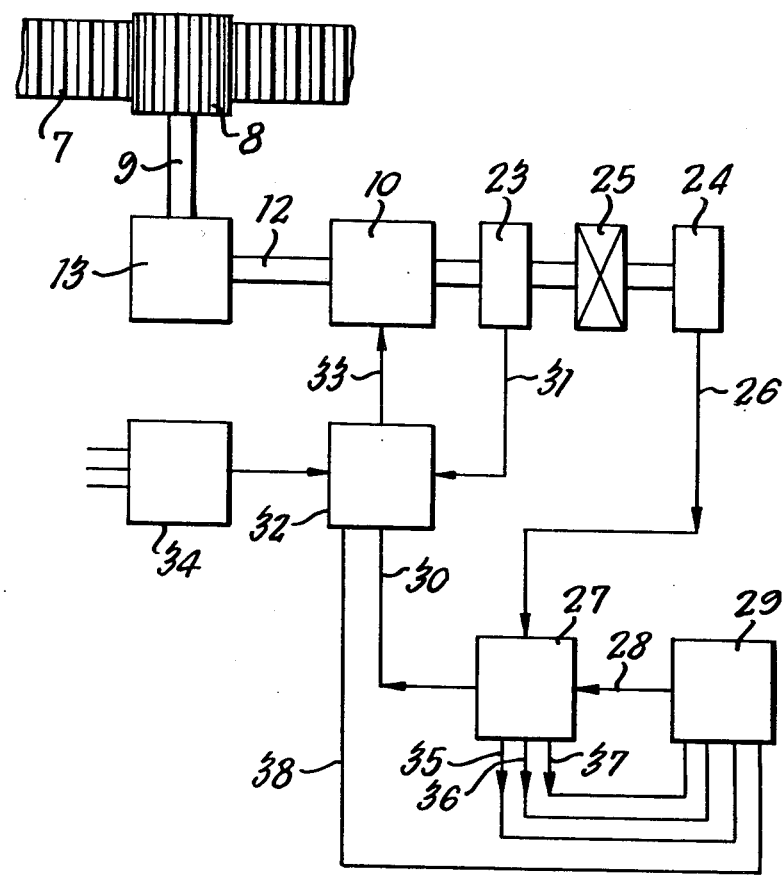
FIG. 4 is a block circuit diagram of an electrical servo-mechanism for driving a movable transfer carriage of the machine.

The motor 10 drives the transfer carriage 5 under servo or feedback control. This control is provided by an electrical servo-mechanism illustrated in block circuit form in FIG. 4 which also shows diagrammatically the shafts 9 and 12, the gearbox 13, the pinion 8 and the rack 7. As shown in FIG. 4 the motor 10 drives a tachometer 23 and a single turn potentiometer 24 through a reduction gearbox 25. As an alternative, a multi-turn potentiometer could be used and the reduction gearbox 25 omitted. The output of the potentiometer 24 is an electrical signal (within the range 0 to 10 volts) proportional to the displacement of the motor shaft 12 from a datum position, and this position signal is fed by a lead 26 to an input module board 27. The input module board 27 receives by way of a lead 28 an electrical command signal from a computer 29.

The computer 29 comprises generating means for generating the electrical command signal. The magnitude of the electrical command signal varies in accordance with a desired position against time curve for the movement of a reheated parison from the intermediate station B to the shaping station C. As will appear from the description below, the electrical or hydraulic servomechanism is operated by the electrical command signal to control the movement of the transfer carriage 5. Within the output module board 27 there is a differential amplifier which provides an electrical signal representative of the difference between the command signal from the computer 29 and the position signal from the potentiometer 24. Thus, the input module board 27 comprises difference means operable to compare the position signal with the command signal and to derive from this comparison an error signal and this error signal is used to operate the servo-mechanism. The error signal is fed on a lead 30 to a servo-drive means 32 which may employ thyristors or rely on pulse width modulation. The servo drive means 32 provides a DC current which is representative of the error signal on which is applied by a lead 33 to the motor 10 to drive the latter. Power for the servo drive means 32 is provided by a transformer 34. Servo drive means 32 has over voltage and over current protection.

The tachometer 23 provides a signal representative of the speed of the motor 10, and this signal is fed by a lead 31 to the servo drive means 32. If the signal on the lead 31 indicates that the motor 10 is rotating in excess of a predetermined maximum speed, this condition is sensed and emergency action is initiated, which may comprise the production of a visible warning to the operator and discontinuation of the power supply to the motor 10. As an alternative to disconnecting the power supply to the motor 10, the speed of the latter may be limited to prevent further increase in speed above the predetermined maximum speed. Thus, the input module board 27 comprises emergency action means operable to take emergency action if the rotational speed of the motor 10 detected by the tachometer 23 exceeds a predetermined maximum.

The tachometer 23 also provides velocity feedback to the servo mechanism which improves the servo loop stability and gain, and renders the system immune to varying frictional affects which can result from the tightening or loosening of bearings. The provision of velocity feedback enables faster transfer speeds to be obtained.

As a result of the feedback action provided by the circuit of FIG. 4, rotation of the output shaft of the motor 10 follows or "tracks" the movement commanded by the computer 29. In consequence, the graph depicting displacement of the carriage 5 against time can be made to conform with any desired profile which is fed into the computer 29. This facility exists for both the operative stroke of the carriage 5 (when the latter carries parisons) and for the return stroke of the carriage, within the physical limitations of the system of movable parts. However, it is the movement of the transfer carriage 5 from the station B to the station C which is important because this is when the carriage 5 carries parisons. The return movement of the carriage 5 from the station C to the station B, when the carriage 5 is not carrying parisons, can be accomplished in the quickest possible manner.

Figure 5A:
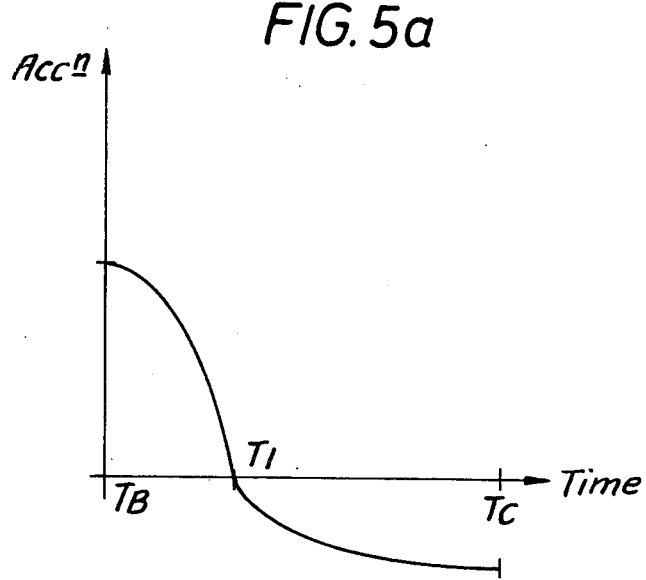
FIGS. 5a, 5b and 5c are graphs showing three possible variations of carriage acceleration with time.
Figure 5B:
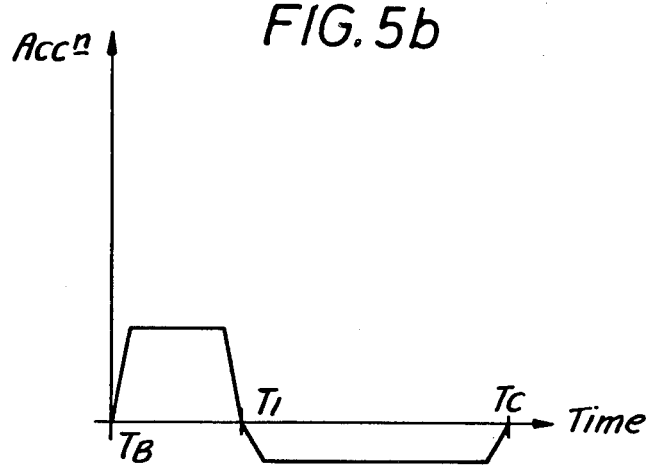
Figure 5C:
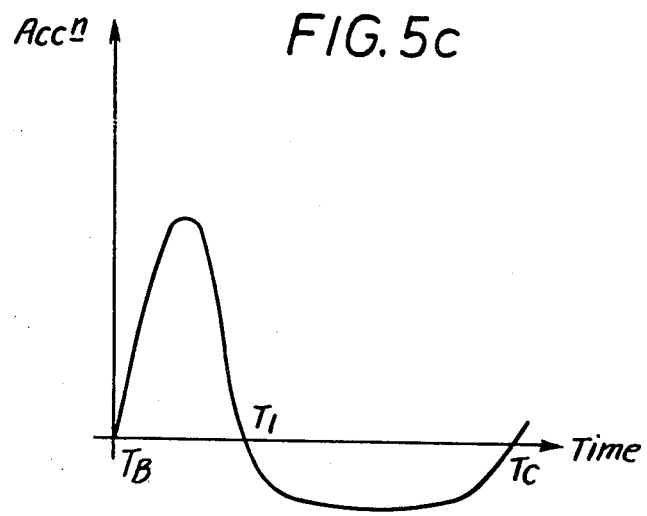

FIGS. 5a, 5b and 5c show three possible variations of carriage acceleration with time as commanded by the computer 29, in each Figure the acceleration is plotted from time $T_B$ (when the carriage 5 is at the station B) to time $T_C$ (when the carriage 5 is at the station C). The curve of FIG. 5a can be regarded as a modification of half a cycle of a cosine wave, the time $T_1$ at which the curve crosses the time axis being nearer to the time datum $T_B$, than to time $T_C$. It has been found advantageous for the time $T_1$ to lie between 0.3 and 0.4 (preferably substantially 0.35) of the time interval between $T_B$ and $T_C$, leaving the major part of the transfer time available for deceleration of the parisons. The profile of FIG. 5b shows an alternative variation of acceleration with time. This curve is called a CPC curve because if it is integrated twice to provide a displacement against time curve, the straight lines form in succession a curve with a cubic variation, a parobolic variation and a cubic variation in each of the acceleration and deceleration parts of the curve. Here again, the time $T_1$ at which the curve crosses the time axis is between 0.3 and 0.4 of the time interval $T_B$ to $T_C$.

The curve of FIG. 5c can be regarded as a modification of the curve of FIG. 5a. In FIG. 5c, the acceleration is zero at each of the times $T_B$ and $T_C$ and this variation applies less a jerk to the parisons at the beginning and end of the transfer movement than the curve of FIG. 5a. As with FIGS. 5a and 5b, the curve of FIG. 5c crosses the time axis at time $T_1$ which lies between 0.3 and 0.4 of the time interval $T_B$ to $T_C$.

In each of the curves of FIGS. 5a, 5b and 5c, more time is allotted to deceleration than to acceleration in order to reduce the tendency of the parisons to swing at the end of the transfer movement, thereby enabling the blow moulds to be closed earlier than otherwise would be the case.

The existence on the lead 26 of an electrical signal representative of the position of the carriage 5 enables various checking functions to be performed, and three of these checking functions will now be described, the input module board 27 providing emergency action means to initiate emergency action if any of the checks show that an undesirable condition has occurred.

The first of the checking functions involves comparing the actual position signal from the potentiometer 24 with the command signal from the computer 29. This comparison is done by the input module board 27 and is maintained through each machine cycle. During correct operation of the machine, when the actual position signal differs from the command signal by not more than a predetermined acceptable tolerance (such as 20 percent), the output signal is high on a lead 35 from the board 27. The signal on the lead 35 is sensed by the computer 29, and so long as this signal remains high the computer 29 produces an enable signal on a lead 38 to maintain power to the servo drive means 32. If the actual position signal differs from the command signal by more than the predetermined acceptable tolerance, the output signal on the lead 35 goes low. The incident of a low signal on the lead 35 generates in the computer 29 an interrupt signal which cancels the enable signal on the lead 38, thereby shutting off power to the servo drive means 32. Hence, the power to the motor 10 is disconnected if the actual position of the carriage 5 differs from the commanded position by too large a margin.

Unlike the first checking function, the second checking function is carried out only when the machine is started or restarted, and the purpose of this second checking function is to ensure that the carriage 5 is at or near the intermediate station B when the machine is started. This is a precaution against the carriage 5 travelling very rapidly to the station 3 when the machine is started. The second checking function involves comparing the actual position signal from the potentiometer 24 with a reference signal which is set into the board 27 and which corresponds to the transfer carriage 5 being within a preset distance (e.g. 10 percent of its total travel) of the intermediate station B. This second checking function is carried out by the board 27 to which is connected a lead 36. The signal on the lead 36 is high if the comparison indicates that the carriage 5 is within the preset distance of the station B and the signal on the lead 36 is low if the comparison indicates that the carriage 5 is outside the preset distance. A low signal on the lead 36 prevents the machine from being started.

The purpose of the third checking function is to prevent the blow head (which is lowered to the blow mould at the shaping station once in each cycle) colliding with the transfer carriage 5. The third checking function involves comparing the actual position signal from the potentiometer 24 with a signal corresponding to the transfer carriage 5 being within a preset distance, that is a certain percentage of its total travel, from the intermediate station B. This preset distance is chosen so that when the carriage 5 is within this distance it cannot be struck by the blow head as the latter descends to the blow moulds at the shaping station C. The third checking function is undertaken at the time in each cycle when the blow head is due to come down to the blow moulds. At this time in each cycle, the computer 29 examines the output signal on a lead 37 of the input module board 27. If the output signal on the lead 37 is high, this shows that the carriage 5 is within the preset distance and the computer 29 allows the blow head to descend. If the output signal on the lead 37 is low, this indicates that the carriage 5 is outside the preset distance and that there is a danger of the blow head colliding with the carriage 5. Under these circumstances, the computer produces a signal preventing the lowering of the blow head, so that collison between the blow head and the transfer carriage 5 is avoided.

Figure 6:
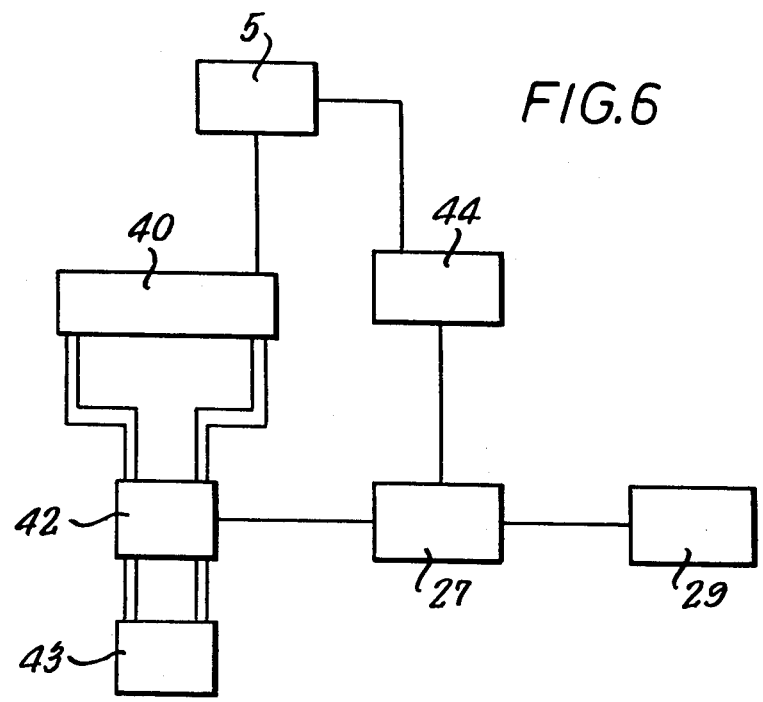
FIG. 6 is a block circuit diagram of a hydraulic servo-mechanism which is an alternative to the electrical servo-mechanism, shown in FIG. 4.

FIG. 6 is a block diagram of a hydraulic servo-mechanism which may be used as an alternative to the electrical servo-mechanism to drive the transfer carriage 5 of the machine. In the arrangement of FIG. 6, the transfer carriage 5 is driven by a hydraulic cylinder 40 to which hydraulic fluid is fed by a hydraulic servo valve 42 connected to a hydraulic pump 43. The position of the carriage 5 is sensed by a transducer 44 (e.g. a potentiometer) which provides a position signal to the input module board 27. The input module board 27, in a manner similar to that described in connection with FIG. 4, receives from the computer 29 a command signal representing a desired variation of carriage position with time. The input module board 27 derives an electrical error signal representing the difference between the position signal from the transducer 44 and the command signal from the computer 29, this error signal being fed to the servo valve 42 to control the latter so that movement of the carriage 5 follows the desired variation of the position with time.

The desired embodiments of FIGS. 4 and 6 use a potentiometer, but it will be appreciated that any precision transducer providing an electrical signal representative of carriage position (or motor output shaft displacement) could be used to provide the position signal for the feedback loop. Further, the graphs of FIGS. 5a, 5b and 5c show three possible variations of acceleration with time but other variations are possible by feeding into the computer 29 the appropriate position against time curve giving rise to the desired variation of acceleration with time.

The facility of substituting different position against time curves makes it much easier to change the motion of the carriage 5, for example when changing the machine from producing one type of glassware to another.

We claim:

1. An individual section glassware forming machine comprising three operating stations which are, respectively, a blank station including a blank mould for forming a parison, an intermediate station in which reheating of a parison takes place, and a shaping station including a blow mould for finally shaping an article of glassware, and transfer means driven by a motor for carrying a reheated parison from the intermediate station to the shaping station characterised in that said motor is an electric motor and in that the machine also comprises generating means for generating an electrical command signal the magnitude of which varies in accordance with a desired position against time curve for the movement of a reheated parison from the intermediate station to the shaping station, and an electrical servo-mechanism operated by said electrical command signal, said electrical servo-mechanism operatively connected to said motor to control the movement of the transfer means.

2. A machine according to claim 1, characterised in that the machine comprises position indicating means (24) operable to provide an electrical position signal representative of the actual position of the transfer means (5), and difference means (27) operable to compare the position signal with the command signal and to derive from this comparison an error signal which is used to operate the servo-mechanism (32).

3. A machine according to claim 2, characterised in that the machine comprises emergency action means (27) operable to compare the position signal with the command signal and initiate emergency action if the position signal deviates from the command signal by more than a predetermined tolerance.

4. A machine according to claim 3, characterised in that the emergency action means (27) is operable, on starting the machine, to compare the position signal with a signal corresponding to the transfer means (5) being within a predetermined distance from the intermediate station (B), and to initiate emergency action if the transfer means (5) is not within this distance on starting of the machine.

5. A machine according to either one of claims 3 or 4, characterised in that the emergency action means (27) is operable at the time in each cycle when a blow head of the machine is due to be lowered at the shaping station (C), to compare the position signal with a signal corresponding to the transfer means (5) being within a predetermined distance of the intermediate station B, and to initiate emergency action if the transfer means (5) is not within that distance.

6. A machine according to claims 1 or 2, characterised in that the machine comprises a tachometer (23) which is driven by the motor (10) and provides velocity feedback to the servo-mechanism (32).

7. A machine according to claim 6, characterised in that the machine comprises emergency action means (27) operative to take emergency action if the rotational speed of the motor (10) detected by the tachometer (23) exceeds a predetermined maximum.

8. A machine according to claim 1, characterised in that the generated electrical command signal is a cubic-parabolic-cubic curve, that is a curve which has portions which are successively cubic, parabolic, cubic, cubic, parabolic and cubic over the time of transfer of the parison from the intermediate station (B) to the shaping station (C).

9. A machine according to claim 1, characterised in that the electrical command signal is such that the reheated parison is moved from the intermediate station (B) to the shaping station (C) in a motion in which the period of acceleration from rest at the intermediate station (B) is shorter than the period of deceleration to rest at the shaping station (C).

10. A machine according to claim 1, characterised in that the generated electrical command signal varies such that the transition between acceleration and deceleration in the movement of the reheated parison from the intermediate station (B) to the shaping station (C) occurs at a time within a range of 0.3 to 0.4 of the total time of transfer of the parison from the intermediate station (B) to the shaping station (C).

11. An individual section glassware forming machine comprising at least two operating stations and transfer means driven by a motor for moving a parison from one station to another station characterised in that said motor is an electric motor and in that the machine also comprises generating means for generating an electrical command signal the magnitude of which varies in accordance with a desired position against time curve for the movement of said transfer means and an electrical servo-mechanism operated by said electrical command signal, said electrical servo-mechanism operatively connected to said motor to control the movement of the transfer means.

12. An individual section glassware forming machine comprising two operating stations which are, respectively, a blank station including a blank mold for forming a parison and a shaping station including a blow mold for finally shaping an article of glassware, and transfer means driven by a motor for carrying a formed parison from said blank station to said shaping station characterised in that said motor is an electric motor and in that the machine also comprises generating means for generating an electrical command signal, the magnitude of which varies in accordance with a desired position against time curve for the movement of a parison, and an electrical servo-mechanism operated by said electrical command signal, said electrical servo-mechanism operatively connected to said motor to control the movement of the transfer means.

13. An individual section glassware forming machine comprising at least two operating stations and transfer means driven by a motor for moving a parison linearly from one station to another station without inversion characterized in that said motor is an electric motor and in that the machine also comprises generating means for generating an electrical command signal, the magnitude of which varies in accordance with a desired position against time curve for the movement of said transfer means, and an electrical servo-mechanism operated by said electrical command signal, said electrical servo-mechanism operatively connected to said motor to control the movement of the transfer means.

14. An individual section glassware forming machine comprising at least two operating stations and transfer means driven by a motor for moving a parison from one station to another station without inverting the parison, characterised in that said motor is an electric motor and in that the machine also comprises control means operatively connected to said motor for generating an electrical command signal for controlling said motor, said signal varying in accordance with a desired position against time curve for controlling the movement of said parison.

15. An individual section glassware forming machine comprising at least two operating stations and transfer means driven by a motor for moving a parison from one station to another station, characterised in that said motor is an electric motor and in that the machine also comprises control means operatively connected to said motor for generating an electrical command signal for controlling said motor, said signal varying in accordance with a desired position against time curve for controlling the movement of said parison.

16. An individual section glassware forming machine comprising at least two operating stations and transfer means driven by a motor for moving a parison from one station to another station characterised in that said motor is an electric motor and in that the machine also comprises generating means for generating an electrical command signal the magnitude of which varies in accordance with a desired position against time curve for the movement of said transfer means and an electrical servo-mechanism operated by said electrical command signal, said electrical servo-mechanism operatively connected to said motor to control the movement of the transfer means.

* * * * *